June 15, 1954  B. W. THOMPSON  2,681,416
NEUTRON SCINTILLATION COUNTER
Filed Oct. 23, 1951

INVENTOR.
BOYD W. THOMPSON
BY
Roland A. Anderson
ATTORNEY.

Patented June 15, 1954

2,681,416

UNITED STATES PATENT OFFICE 2,681,416

NEUTRON SCINTILLATION COUNTER

Boyd W. Thompson, Walnut Creek, Calif., assignor to the United States of America as represented by the United States Atomic Energy Commission Application October 23, 1951, Serial No. 252,662

4 Claims. (Cl. 250—71)

This invention relates to a neutron counter and more particularly to an apparatus and method for detecting neutrons utilizing scintillation material and light detecting apparatus.

The demand for neutron detectors and counters has steadily increased since the recognition of the existence and nature of neutrons about 1932. The neutron was found to be a particle having no charge and having about the same mass as a proton. Neutrons were first produced by bombarding a light element such as beryllium with alpha particles, but now are produced in a variety of nuclear reactions. Bombardment of many light elements such as beryllium, lithium, boron, fluorine and aluminum with high energy protons, deuterons, as well as alpha particles, often result in the emission of neutrons. Neutrons are also produced in fission reactions, such as occur in a nuclear reactor (pile) or atomic bomb. Since neutrons possess no charge, they are not directly detectable by geiger tubes, cloud chambers or ionization chambers. It is customary to detect neutrons by causing a nuclear reaction such as the neutron-alpha reaction or the neutron-proton reaction and detecting the resulting alpha particle or proton released by the reaction. The existing neutron detectors generally comprise a means of producing the neutron-proton reaction (e. g. a block of paraffin), and an ionization chamber for detection of the resultant protons.

In the present invention, the gas-filled ionization chamber is eliminated, and the principle of scintillation detection of charged particles is utilized. Advantages of the present invention are its simplicity of construction, light weight, ruggedness, speed of response, sensitivity to neutrons and adaptability to a wide variety of conditions as a neutron detector and survey meter.

It is therefore an object of the present invention to provide a new and improved neutron detector and counter.

Another object of the present invention is to provide a neutron counter utilizing means for releasing charged particles with neutrons and scintillation means to detect the charged particles.

Still another object of the present invention is to provide a high speed counting instrument for neutron detection.

A still further object of the present invention is to provide a neutron counter that will survey in substantially all directions simultaneously.

Other objects and advantages will be apparent in the following description and claims considered together with the accompanying drawings of which:

Figure 1:
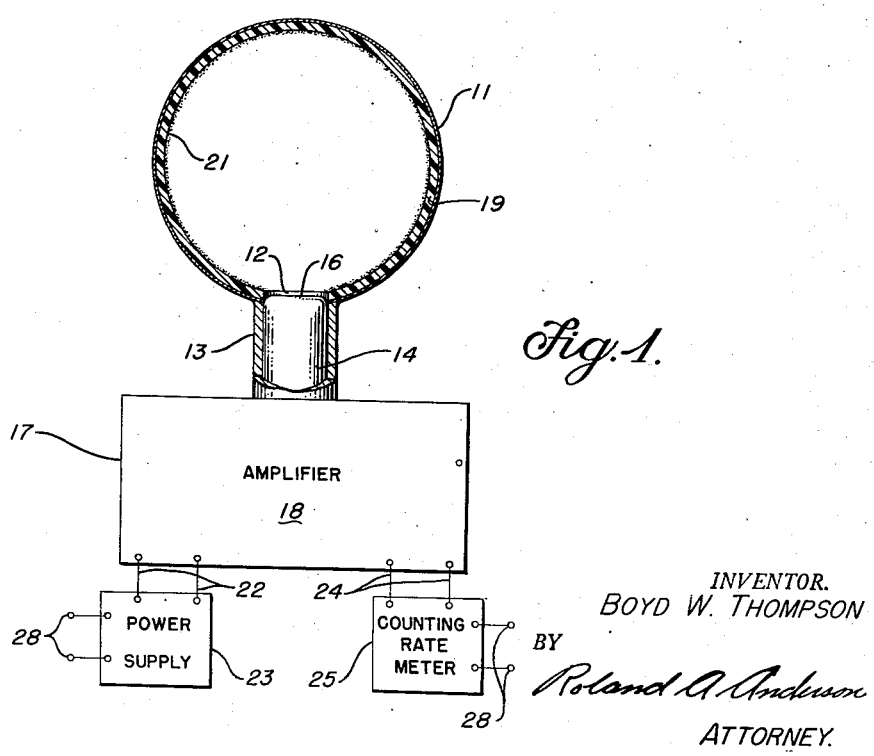
Figure 1 is a partially sectioned elevational view of the invention.

Referring to the drawing and more particularly to Fig. 1, there is shown a thin-walled sphere 11 made of a material, such as copper or aluminum, that does not seriously attenuate neutron flux, but does stop or attenuate light and charged particles. The sphere 11 has an aperture 12 at one position therein. Communicating with the sphere 11 at the aperture 12 is a cylinder 13. The cylinder 13 has the dual function of providing support means for the sphere and providing a light tight housing for a photomultiplier tube 14 disposed therein with the light sensitive cathode 16 exposed to the interior of the sphere 11. The other end of the cylinder 13 communicates with a housing 17 of an amplifier 18. Disposed within the sphere 11 and communicating with the inner surface thereof is a hollow spherical neutron target 19 made of a hydrogenous material, e. g., paraffin or polyethylene. Deposited in a thin layer on the interior surface of the neutron target is a scintillation target 21. The scintillation target 21 is made of a material such as silver-activated zinc sulfide that emits light when struck by protons. The output of the photomultiplier tube 14 is electrically connected in a conventional manner to the amplifier 18. Electrical leads 22 are provided to connect the amplifier 18 with a power supply 23 and electrical lads 24 are provided to connect the signal output of the amplifier 18 to a counting rate meter 25. The electrical leads 22 and 24 may be joined in a multiconductor cable (not shown) for convenience of handling of the instrument.

Figure 2:
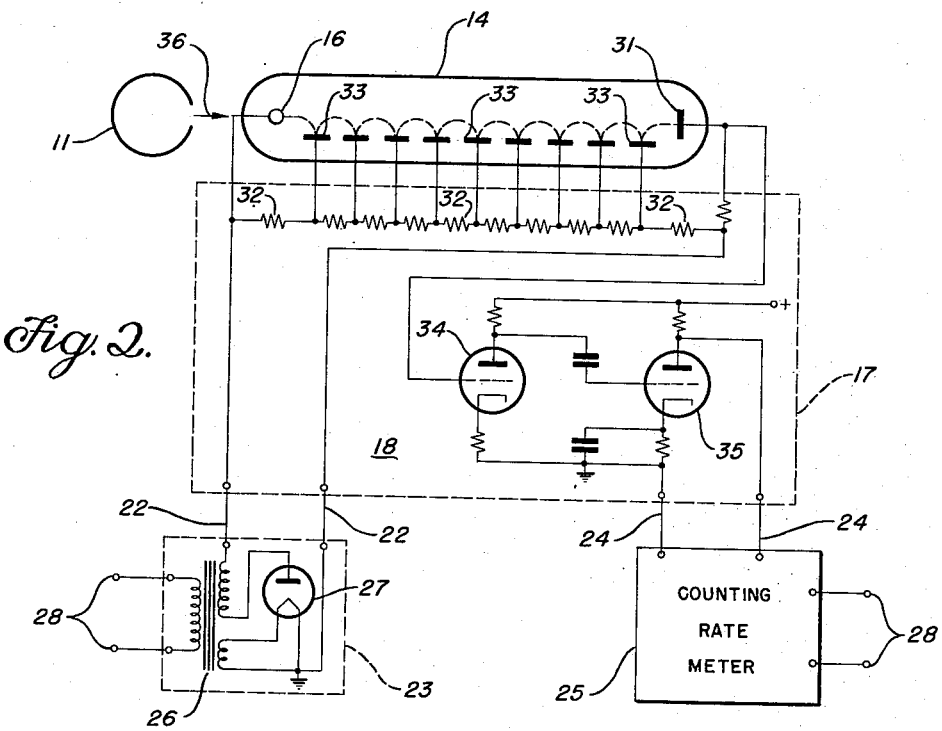
Fig. 2 is a schematic diagram of the electronic circuit for the invention.

Referring to Fig. 2 there is shown a conventional power supply 23 comprising a transformer 26 with a rectifier tube 27 connected as a conventional half-wave rectifier. The input to the power supply 23 may be connected to a commercial alternating voltage source of power 28 or other suitable source and the unidirectional output voltage therefrom is connected in a conventional manner across the cathode 16 and anode 31 of the photomultiplier tube 14 with a resistance voltage divider 32 therebetween to which the dynodes 33 are connected. The output of the photomultiplier tube 14 is connected to the grid of the first amplifier tube 34 of the amplifier 18. The output of the first amplifier tube 34 is capacitively coupled to the grid of the second amplifier tube 35 of the amplifier 18. The output of the second amplifier tube 35 is coupled to a conventional counting rate meter 25. Such counting rate meter may be similar to that described in detail on page 251 and illustrated in Figure 4.21 of the book Electronics by Elmore and Sands, National Nuclear Energy Series. The counting rate meter 25 may also be connected to a commercial source of power 28 for necessary operating potentials. The sphere 11 is shown disposed where light 36 generated therein will strike the photoelectric cathode 16 of the photomultiplier tube 14.

Now consider the operation of the above-described apparatus and circuits. A neutron coming toward the sphere 11 from any direction except near the photomultiplier tube 14 will strike the sphere. Since a neutron possesses no charge it behaves differently when passing through matter than do electrons, deuterons, protons, or other charged particles. The neutron does not exert electric or magnetic forces upon atomic nuclei as do charged particles when passing through matter. Thus the interaction between neutron and a nucleus is regarded as a collision. If a neutron strikes a heavy element such as copper, silver, or lead, elastic collisions occur and the energy lost by the striking neutron is very small. Thus neutrons pass readily through the thin-walled copper sphere 11. However, when neutrons strike a very light atom the energy of the neutron is reduced materially by each collision. Therefore, high energy neutrons passing through the outer sphere 11 have their energy reduced considerably in the neutron target 19 which is made of polyethylene or paraffin. High energy neutrons thus slowed down will then be captured in an inelastic collision by the hydrogen in the polyethylene or paraffin. This inelastic collision between a low energy neutron and hydrogen results in a nuclear (n,p) reaction and a proton is released. Since a proton is a charged particle it can be detected by its ability to produce fluorescence in certain chemicals. The protons emitted from the neutron target 19 strike the scintillation target 21 which is made of fluorescing material such as silver-activated zinc sulfide. When the protons strike the target 21 it fluoresces and emits visible light. The zinc sulfide target 21 has a high reflection factor for light, so it acts as a photometric integrating sphere. Thus the photoelectric cathode 16 of the photomultiplier tube 14 detects light emitted by the scintillation target 21 when neutrons strike the sphere 11 at any point. The amplifier 18 amplifies the photomultiplier tube output which is in turn fed into the counting rate meter 25 which gives a reading proportional to the number of neutrons striking the sphere 11.

It is to be noted that the sphere 11 may be made of a material other than copper provided the material will not stop neutrons. The neutron target 19 may be made of a material containing any light element that will slow down fast neutrons and react with slow neutrons to release a charged particle. The scintillation target 21 may be made of any of a variety of materials, preferably one that emits visible light and one that has a good reflection factor for that visible light.

While the salient features of this invention have been described in detail with respect to one embodiment, it will, of course, be apparent that numerous modifications may be made within the spirit and scope of the present invention; and it is therefore not desired to limit the invention to the exact details shown except insofar as they may be defined in the following claims.

What is claimed is:

1. A neutron detector comprising a thin-walled spherical metallic housing which is opaque to light and charged particles and substantially transparent to neutrons, a thin layer of hydrogenous material disposed on the inner surface of said housing whereby neutrons are captured and protons released, a thin layer of fluorescent material disposed on the inner surface of said hydrogenous material, said fluorescent material being sensitive to proton bombardment to emit light, and light detecting means disposed in an aperture of said housing.

2. A neutron detector comprising a spherical metallic housing having a circular aperture therein, a hollow spherical neutron target made of a hydrogenous material disposed within said spherical shell and adjacent thereto, wherein high energy neutrons are slowed down, captured, and charged particles are released, a fluorescent coating sensitive to charged particles adherent to the interior surface of said neutron target, a photomultiplier tube having the cathode thereof disposed in the aperture of said metallic housing, means for supplying operating voltages to said photomultiplier tube and means for counting the output pulses from said photomultiplier tube.

3. A neutron detector comprising a spherical shell having a circular aperture therein, a thin-walled spherical neutron target made of a hydrogenous material disposed within said metallic shell and adjacent thereto, wherein neutrons are captured and protons are released, a fluorescent zinc sulfide coating adherent to the interior surface of said neutron target, a photomultiplier tube having the cathode thereof disposed in the aperture of said metallic shell, power supply means for providing operating voltages to said photomultiplier tube, amplifying means for increasing the amplitude of the output signals from said photomultiplier tube, and counting means to determine the number of output signals from said photomultiplier tube.

4. A neutron detector comprising a spherical metallic housing having a circular aperture therein, a hollow spherical polyethylene target disposed within said housing and affixed thereto, a silver-activated zinc sulfide coating adherent to the interior surface of said target, a photomultiplier tube having the photosensitive cathode thereof disposed in the aperture of said metallic housing, power supply means for providing operating voltages to said photomultiplier tube, and means for counting the output pulses of said photomultiplier tube.

References Cited in the file of this patent

UNITED STATES PATENTS

| Number | Name | Date |
|---|---|---|
| 2,508,772 | Pontecorvo | May 23, 1950 |
| 2,534,932 | Sun | Dec. 19, 1950 |